United States Patent [19]
Takayama et al.

[11] Patent Number: 5,921,281
[45] Date of Patent: Jul. 13, 1999

[54] HYDRAULIC FLUID PASSAGE SWITCHING VALVE

[75] Inventors: Toshio Takayama; Kunihiro Matsunaga, both of Yamanashi-ken, Japan

[73] Assignee: Tokico Ltd., Kawasaki, Japan

[21] Appl. No.: 09/042,623

[22] Filed: Mar. 17, 1998

[30] Foreign Application Priority Data

Mar. 19, 1997 [JP] Japan .................................. 9-067051

[51] Int. Cl.$^6$ .................................................. F15B 13/044
[52] U.S. Cl. .............................. 137/625.65; 137/625.26; 251/129.07; 251/129.21; 303/119.2
[58] Field of Search .................... 137/625.26, 625.65; 251/129.07, 129.21; 303/119.2

[56] References Cited

U.S. PATENT DOCUMENTS

| | | | |
|---|---|---|---|
| 3,285,285 | 11/1966 | Bielefeld | 137/625.65 |
| 3,588,039 | 6/1971 | Chelminski et al. | 251/129.15 |
| 4,655,249 | 4/1987 | Livet | 251/129.21 X |
| 4,979,542 | 12/1990 | Mesenich | 137/625.65 |
| 5,114,116 | 5/1992 | Muller et al. | 251/129.21 X |
| 5,445,189 | 8/1995 | Yamamuro | 137/625.65 |
| 5,584,323 | 12/1996 | Yamamuro | 137/129.07 X |
| 5,765,930 | 6/1998 | Kervagoret et al. | 137/625.65 X |

FOREIGN PATENT DOCUMENTS 6-42665  2/1994  Japan .................................. 137/625.65

*Primary Examiner*—Gerald A. Michalsky
*Attorney, Agent, or Firm*—Wenderoth, Lind & Ponack, L.L.P.

[57] ABSTRACT

A fluid passage switching valve includes a core structure provided with an input passage extending from an input port. The input passage opens on an outer peripheral surface of the core structure at such a position that when a plunger is in a fluid cut-off position, the input passage is closed by an inner surface of the plunger, and as the plunger moves toward a fluid passing position, the input passage is opened and communicated with an input port-side fluid chamber. An output port is communicated with an output port-side fluid chamber. The plunger has a communicating bore which provides communication between the input and output port-side fluid chambers. The pressure-receiving area of the plunger in relation to the input port-side fluid chamber is approximately the same as that of the plunger in relation to the output port-side fluid chamber over the entire travel range of the plunger. A seal device blocks communication between the input passage and the input port-side fluid chamber when the plunger is in the fluid cut-off position.

2 Claims, 6 Drawing Sheets

HYDRAULIC FLUID PASSAGE SWITCHING VALVE

BACKGROUND OF THE INVENTION

The present invention relates to a hydraulic fluid passage switching valve used, for example, in a controller for a brake of a vehicle or in a hydraulic suspension controller for a vehicle.

In a known switching valve, a movable valve member is urged by a spring exhibiting a strong force in order to hermetically seal a supply port against the pressure of a supplied hydraulic fluid when the valve member is in a position for closing the supply port. A solenoid used to actuate the valve member needs to exhibit a sufficiently strong force to overcome the force of the spring. Consequently, the overall size of the apparatus becomes unfavorably large, and the amount of heat generated therein is disadvantageously large.

SUMMARY OF THE INVENTION

In view of the above-described problems, an object of the present invention is to provide a switching valve capable of satisfactorily operating with a solenoid exhibiting small force.

To attain the above-described object, the present invention provides a fluid passage switching valve having an input port connected to a pressurized fluid supply source, and an output port connected to a device which uses a pressurized fluid. The switching valve includes a valve body provided with the input port and the output port. The valve body has a cylinder portion formed therein. A core structure has a portion extending in the cylinder portion of the valve body. A plunger is provided to slide on the core structure and to divide the cylinder portion into an input port-side fluid chamber and an output port-side fluid chamber. The plunger is movable between a fluid cut-off position and a fluid passing position. A spring urges the plunger toward the fluid cut-off position. A solenoid, when energized, causes the plunger to move toward the fluid passing position against the force of the spring. The core structure is provided with an input passage extending from the input port. The input passage opens on the outer peripheral surface of the core structure at such a position that when the plunger is in the fluid cut-off position, the input passage is closed by the inner surface of the plunger, and as the plunger moves toward the fluid passing position, the input passage is opened and communicated with the input port-side fluid chamber. The output port is communicated with the output port-side fluid chamber. The plunger has a communicating bore which provides communication between the input port-side fluid chamber and the output port-side fluid chamber. The pressure-receiving area of the plunger in relation to the input port-side fluid chamber is approximately the same as that of the plunger in relation to the output port-side fluid chamber over the entire travel range of the plunger. The switching valve further includes a seal portion which blocks communication between the input passage and the input port-side fluid chamber when the plunger is in the fluid cut-off position.

DETAILED DESCRIPTION OF THE INVENTION

Figure 7:
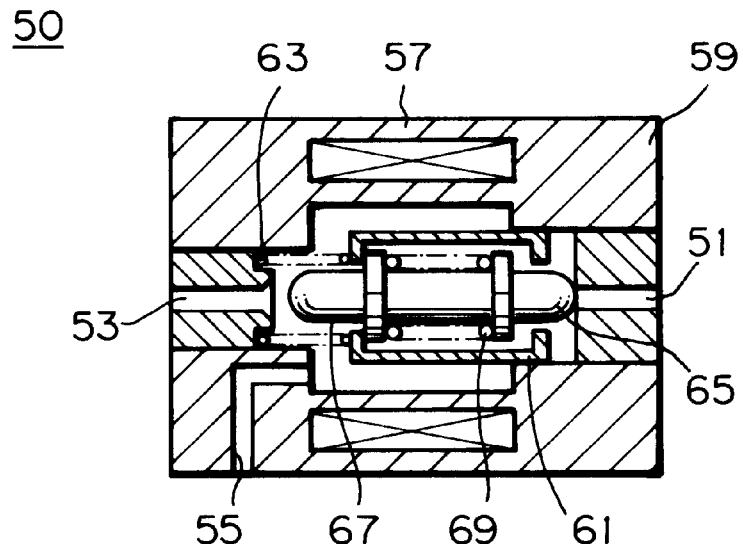
FIG. 7 is a sectional view showing a conventional switching valve in a cut-off position.
Figure 8:
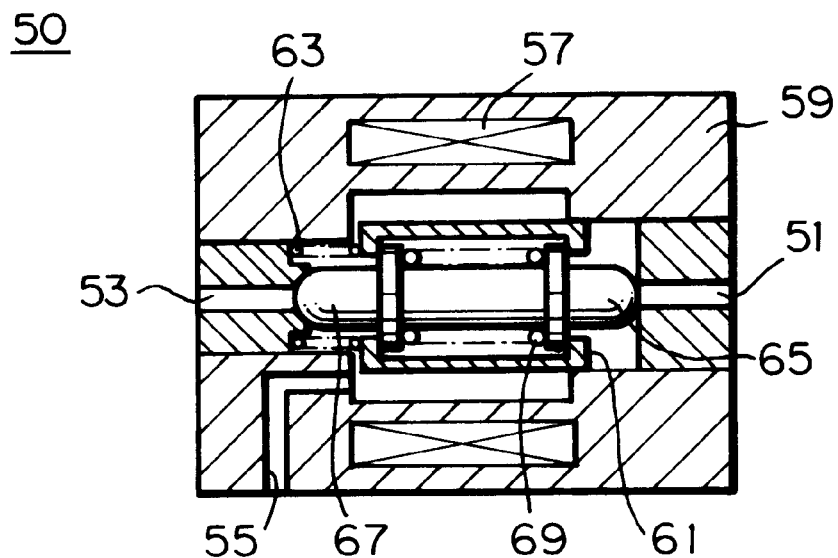
FIG. 8 is a sectional view of the switching valve in FIG. 7 shown in a first-stage operative position.
Figure 9:
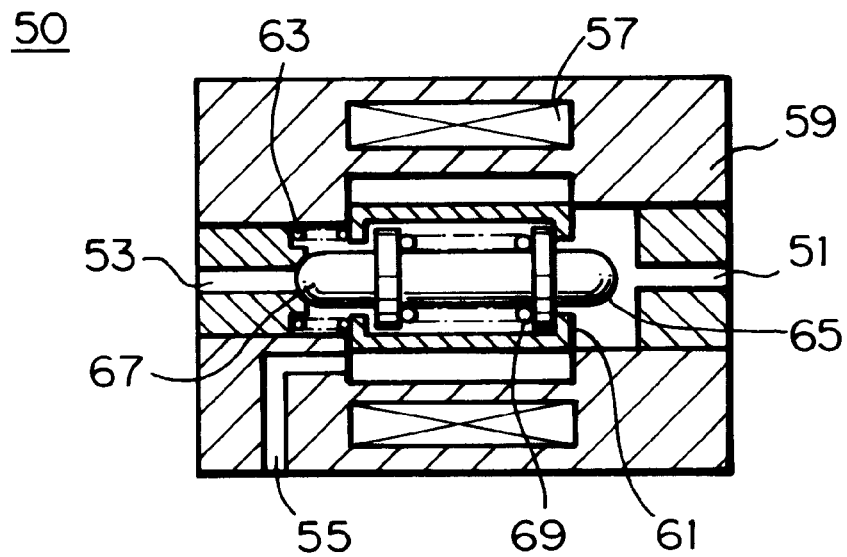
FIG. 9 is a sectional view of the switching valve shown in FIG. 7 in a second-stage operative position.

Prior to the description of embodiments of the present invention, a known hydraulic-fluid passage switching valve will be described with reference to FIGS. 7 to 9 for the purpose of facilitating the understanding of the present invention. FIGS. 7 to 9 show a switching valve 50 which is placed in a hydraulic system of a brake for a vehicle.

A brake controller for a vehicle has an operating quantity detecting sensor that detects an amount by which the brake pedal is pressed. A hydraulic pressure control valve controls a brake hydraulic pressure supplied from a hydraulic pressure supply source to a wheel cylinder. Also a brake hydraulic pressure control device controls the drive of the hydraulic pressure control valve on the basis of an output from the operating quantity detecting sensor. The boosted brake hydraulic pressure from the hydraulic pressure supply source is supplied to the wheel cylinder under control by opening or closing the hydraulic pressure control valve according to the brake pedal operating quantity, thereby enabling the wheel cylinder to exhibit braking force corresponding to the brake pedal operating quantity.

The brake controller of the type described above is further provided with a switching valve, and thereby a passage extending from the hydraulic pressure supply source to the wheel cylinder is caused to change between a fluid passing state and a fluid cut-off state.

In a case where the switching valve 50 is used in the vehicular brake controller, an accumulator of the hydraulic pressure supply source that produces a boosted brake hydraulic pressure is connected to a supply port 51. The wheel cylinder is connected to an output port 55, and a reservoir of the hydraulic pressure supply source is connected to a release port 53.

In this case, the switching valve 50 operates as follows: For example, when a solenoid 57 is not energized, the switching valve 50 is in an inoperative position where the communication between the supply port 51 and the output port 55 is cut off and the output port 55 is communicated with the release port 53. As the solenoid 57 is supplied with a driving current, the switching valve 50 shifts from the inoperative position to an intermediate operative position (transient state) where the output port 55 is cut off from both the release port 53 and the supply port 51, and then reaches an operative position (full-energized state) where the supply port 51 and the output port 55 are communicated with each other and the communication between the output port 55 and the release port 53 is cut off. The switching valve 50 is driven between the inoperative position and the operative position to control the supply of the brake hydraulic pressure to the wheel cylinder, thereby allowing the wheel cylinder to produce a predetermined level of braking force.

Let us denote pressures, spring forces and so forth related to the switching valve 50 as follow:

P1: the hydraulic pressure at the wheel cylinder (output) side;

P2: the hydraulic pressure at the external hydraulic pressure supply source (input) side;

P3: the hydraulic pressure at the reservoir (release) side;

FW: the force of a spring 63 that urges a sleeve 61 toward the supply port 51;

FS: the force of a spring 69 provided between valve elements 65 and 67; and

A: the pressure-receiving area of the valve element 65 which is subjected to the hydraulic pressure applied from the external hydraulic pressure supply source side.

When the solenoid 57 is in an inoperative state as shown in FIG. 7, the output port 55 and the release port 53 are in communication with each other; therefore, pressures at various portions are related to each other as follows:

P1=P3<P2

The sleeve 61 is in a free state where it is not subjected to moving force Fsol from the solenoid 57, and the force FWs of the spring 63 and the force FSs of the spring 69 balance with each other with the valve element 65 being supported in contact with the supply port 51. Hence, the following relationships hold:

FWs=FSs>(P2−P1)A

P2>P1

When the solenoid 57 is in an intermediate operative state as shown in FIG. 8 (i.e. a state where the valve element 65 is in a valve-closing position just before it opens the supply port 51 and the valve element 67 is in a valve-closing position), the output port 55 is not in communication with either of the release and supply ports 53 and 51, and the sleeve 61 is subjected to the moving force Fsolm from the solenoid 57 to move toward the release port 53. Consequently, the valve element 67 comes in contact with the release port 53, and the sleeve 61 begins to engage with the valve element 65, whereas the valve element 65 is still in contact with the supply port 51. Therefore, there is no change in the relationship between the pressures at the various portions, i.e.

P1=P3<P2

However, the force FSm of the spring 69 weakens by an amount corresponding to an amount by which the sleeve 61 is moved toward the release port 53 by the moving force Fsolm from the solenoid 57, and the force FWs of the spring 63 acting on the sleeve 61 increases correspondingly. Consequently, the force FWm of the spring 63 and the force FSm of the spring 69 at this time are given by FWm>FWs FSm<FSs Since the output port 55 has not yet been communicated with the supply port 51, the following relationship holds:

FSm>(P2−P1)A

Moreover, in this intermediate operative state, the spring 69 applies force to both ends of the sleeve 61 in its most extended state. Therefore, at this time, the solenoid 57 is required to produce only a solenoid force Fsolm given by Fsolm=FWm In order for this state to be maintained, the necessary sealing conditions must be met by only the force of the spring 69 that satisfies the relationship of FSm>(P2−P1)A.

When the solenoid 57 is in an operative state as shown in FIG. 9 (i.e. the valve element 65 is in a valve-opening position, whereas the valve element 67 is in a valve-closing position), the output port 55 is in communication with the supply port 51, whereas the release port 53 is closed. Hence, the relationship between the pressures at the various portions is given by P1=P2>P3 (in the boosting process, P3<P1<P2)

The sleeve 61 is further moved toward the release port 53 by the moving force Fsolf from the solenoid 57. Because the valve element 67 has already been in the valve-closing position, the force FSf of the spring 69 increases by an amount corresponding to the amount of movement of the sleeve 61, causing the sleeve 61 to be pressed in a direction counter to the moving force Fsolf of the solenoid 57. The spring 63 is further compressed, and the force FWf of the spring 63 acting on the sleeve 61 increases. Accordingly, the following relationships hold:

FWf>FWm

FSf>FSm (FSf≈FSm)

Fsolf>FSf+FWf

Figure 10:
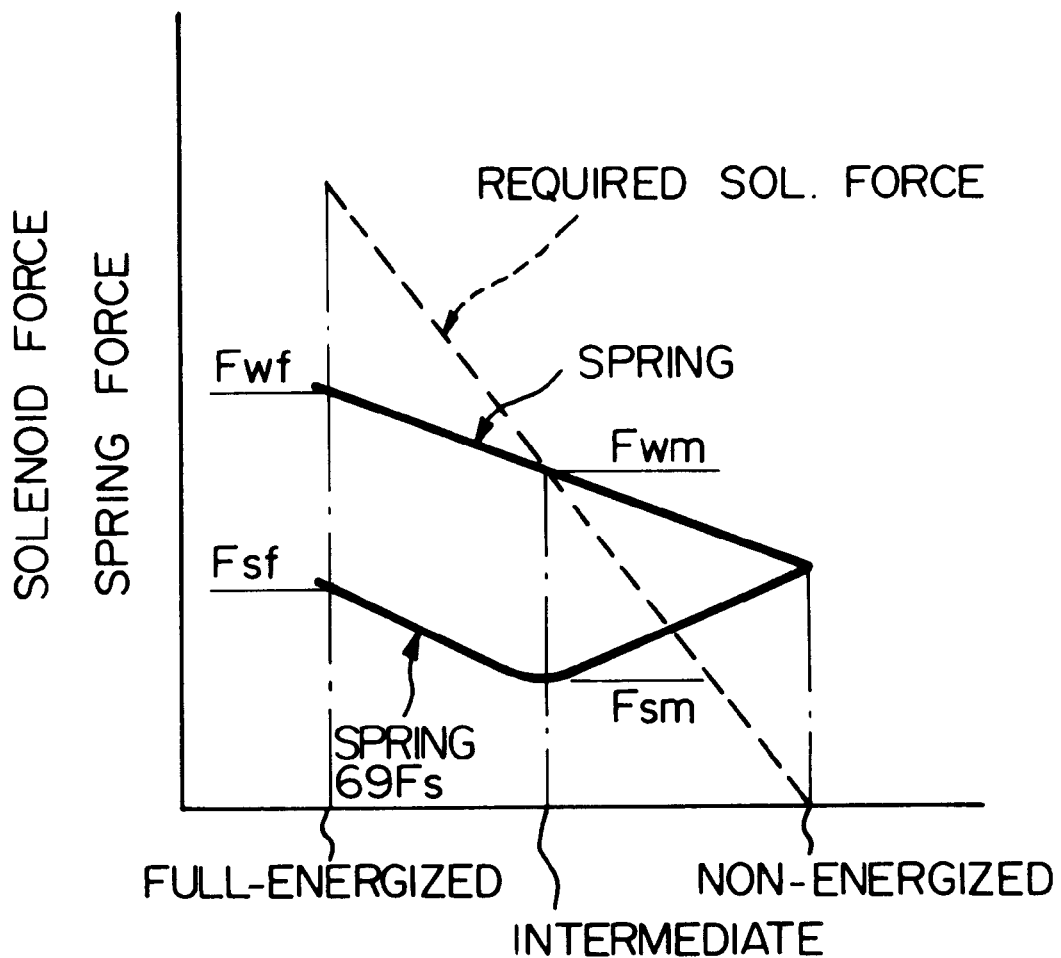
FIG. 10 is a diagram showing the relationship between spring forces and solenoid force in the conventional switching valve.

FIG. 10 shows the above-described relationships.

Accordingly, when the known switching valve, arranged as described above, is in an operative state, the solenoid 57 is required to produce a solenoid force greater than the sum of the force FWf of the spring 63 urging the sleeve 61 in a direction opposite to the direction of movement of it and a force resulting from a pressure difference [(P1−P3)A]. This causes the solenoid 57, i.e. the switching valve 50 itself, to increase in size. Moreover, the responsivity of the switching valve 50 is inevitably degraded.

In view of the above-described circumstances, an object of the present invention is to reduce the size of the solenoid, i.e. the overall size of the switching valve, and to improve the responsivity of the switching valve operation by enabling the switching valve to be actuated by a reduced solenoid force.

Next, embodiments of the present invention will be described.

Figure 1:
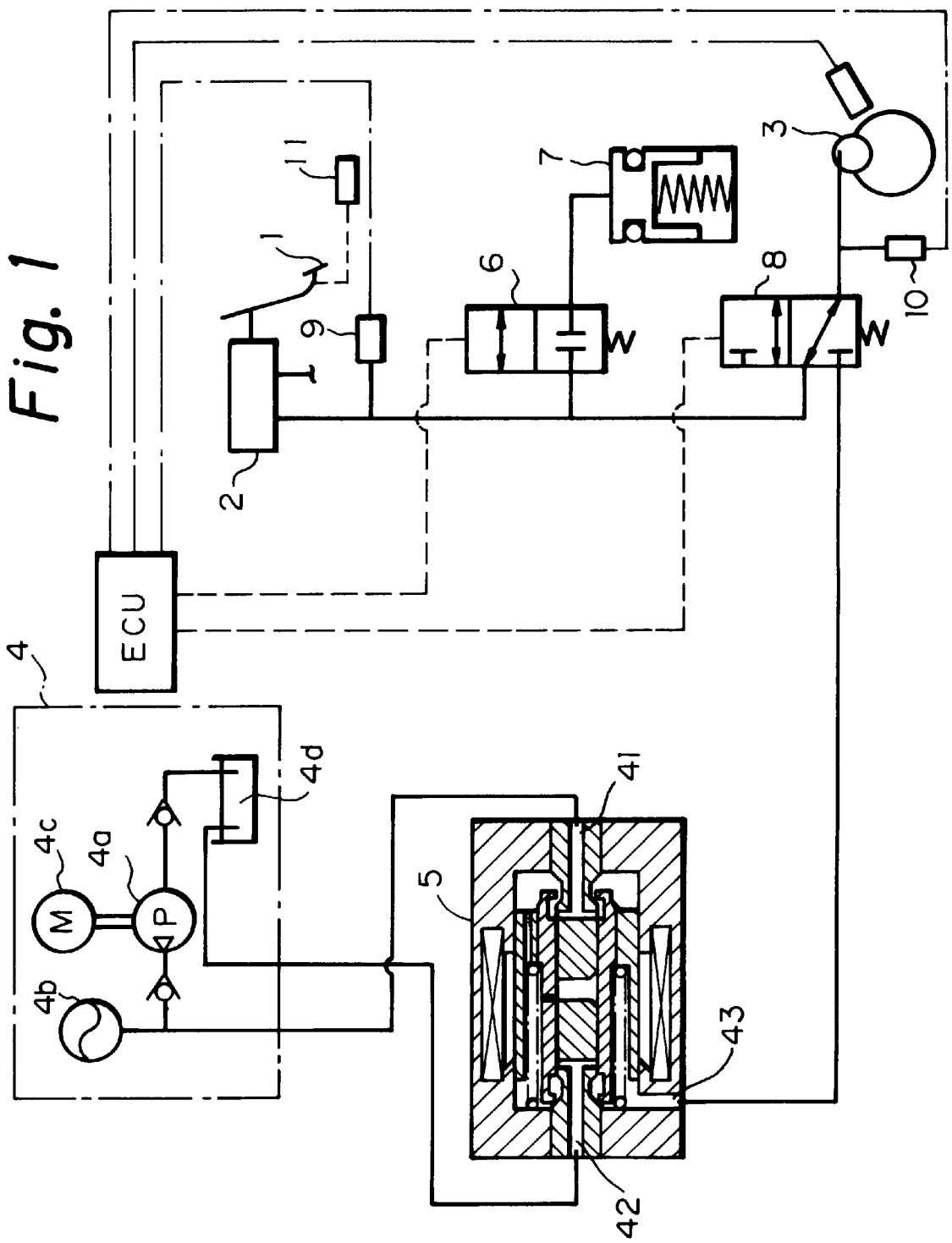
FIG. 1 is a diagram showing a hydraulic system in which a switching valve according to the present invention is used.

FIG. 1 shows a switching valve according to an embodiment of the present invention, which is applied to a brake controller for a vehicle, by way of example.

When a brake pedal 1 is stepped on, a master cylinder 2 produces a hydraulic pressure, and a wheel cylinder 3 produces braking force by the hydraulic pressure. Reference numeral 4 denotes an external hydraulic pressure supply source. A switching valve 5 ON/OFF controls the pressure supplied from the external hydraulic pressure supply source 4 to the wheel cylinder 3 on the basis of the amount by which the brake pedal 1 is stepped on.

The output-side line of the master cylinder 2 is connected through another switching valve 6 to a stroke simulator 7 for giving a stroke and reaction force when the driver operates the brake pedal 1. The wheel cylinder 3 is also connected to the output-side line of the master cylinder 2 through still another switching valve 8 serving as a fail-safe valve. A sensor 9 measures the hydraulic pressure in the master cylinder 2. A sensor 10 measures the hydraulic pressure in the wheel cylinder 3. The outputs of the sensors 9 and 10 are supplied to a control unit ECU. The control unit ECU controls a driving current supplied to a coil of a solenoid (described later) for actuating the switching valve 5 on the basis of the forces detected by the sensors 9 and 10. A brake lever switch 11 senses an operation of the brake pedal 1.

The internal structure of the external hydraulic pressure supply source 4 will be described below. A hydraulic pump 4a is driven by a motor 4c to pump a braking fluid from a reservoir 4d and to produce a boosted hydraulic pressure. An accumulator 4b is connected to the output side of the hydraulic pump 4a to store a highly boosted hydraulic pressure to be supplied to the wheel cylinder 3.

Next, the structure of a switching valve 20 according to this embodiment, which is used as the switching valve 5 of the above-described vehicular brake controller, will be described with reference to FIG. 2.

A body 21 is formed from a magnetic material. The body 21 has a cylinder portion 22 formed in a part thereof. Both ends of the cylinder portion 22 are open to the outside of the body 21 through bores 23a and 23b formed in coaxial relation to the cylinder portion 22.

An approximately cylindrical plunger 24 formed from a magnetic material is accommodated in the cylinder portion 22 so as to be slidable in the axial direction of the cylinder portion 22 (i.e. in the horizontal direction as viewed in the figure). The inner peripheral surface of the plunger 24 has a stepped cylinder-shaped configuration defined by a small-diameter portion and a large-diameter portion. A tubular member 25 is fitted into the small-diameter portion and rigidly secured to the plunger 24 by press fit, welding or the like so as to be axially movable in the cylinder portion 22, together with the plunger 24 as one unit.

Plugs 26a and 26b are tightly inserted and secured in the bores 23a and 23b, respectively, which are formed coaxially with respect to the cylinder portion 22. The proximal ends of the plugs 26a and 26b are formed as large-diameter portions which are secured in the bores 23a and 23b. The distal ends of the plugs 26a and 26b are formed as small-diameter portions which are inserted into the tubular member 25 in a fluid-tight manner.

Further, the plugs 26a and 26b have annular recesses 27a and 27b provided on approximately middle portions in the longitudinal directions thereof at the boundaries between the proximal large-diameter portions and the distal small-diameter portions. Thus, the sliding movement of the tubular member 25 in the axial direction of the cylinder portion 22 is limited by fluid-tight contact of the inner peripheral edges at the two ends of the tubular member 25 with the large-diameter portion-side tapered wall surfaces 28a and 28b of the annular recesses 27a and 27b.

The plugs 26a and 26b are provided therein with passages 29a and 29b, respectively. Each of the passages 29a and 29b opens at one end thereof on the end surface at the proximal end of the associated plug 26a or 26b and extends at the other end thereof toward the inner side in the axial direction. The plugs 26a and 26b are further provided with passages 30a and 30b, respectively, which extend radially of the plugs 26a and 26b. One end of each of the passages 30a and 30b opens on the plug side surface at a position adjacent to the associated annular recess 27a or 27b. The other ends of the passages 30a and 30b are communicated with the other ends of the passages 29a and 29b, respectively.

The inner peripheral surfaces at both ends of the tubular member 25 are provided with annular grooves 31a and 31b. The annular groove 31a has a groove width which is greater than the axial length of the outer periphery of the small-diameter portion of the plug 26a between the annular recess 27a and the passages 30a. Similarly, the annular groove 31b has a groove width greater than the axial length of the outer periphery of the small-diameter portion of the plug 26b between the annular recess 27b and the passages 30b.

The annular grooves 31a and 31b are arranged as follows: When the tubular member 25 is in a state where the end of the tubular member 25 on the small-diameter inner periphery side of the plunger 24 is in contact with the wall surface 28a of the recess 27a of the plug 26a, whereas the end of the tubular member 25 on the large-diameter inner periphery side of the plunger 24 is separate from the wall surface 28b of the recess 27b of the plug 26b, the annular groove 31a does not face the openings of the passages 30a, and the passages 30a are closed by the inner peripheral surface of the tubular member 25, whereas the annular groove 31b faces the openings of the passages 30b. On the other hand, when the tubular member 25 is in a state where the end of the tubular member 25 on the large-diameter inner periphery side of the plunger 24 is in contact with the wall surface 28b of the annular recess 27b of the plug 26b and the end of the tubular member 25 on the small-diameter inner periphery side of the plunger 24 is separate from the wall surface 28a of the annular recess 27a of the plug 26a, the annular groove 31b does not face the openings of the passages 30b, and the passages 30b are closed by the inner peripheral surface of the tubular member 25, whereas the annular groove 31a faces the openings of the passages 30a.

A helical compression spring 32 is provided between the cylinder portion 22 and the step portion between the small- and large-diameter inner peripheral portions of the plunger 24 to urge the plunger 24, together with the tubular member 25, toward the plug 26a (rightwardly as viewed in the figure) at all times. A coil 33 of a solenoid is provided in the body 21 so as to surround the cylinder portion 22. By energizing the coil 33, the plunger 24 and the tubular member 25 are moved toward the plug 26b against the force of the helical compression spring 32. It should be noted that a communicating bore 34 axially extends through the plunger 24 to provide communication between two chambers 35a and 35b formed on both sides of the plunger 24, thereby making the pressures in the two chambers 35a and 35b equal to each other and further enabling a fluid to flow through the communicating bore 34 as the plunger 24 moves.

In addition, the body 21 is provided with a passage 35c which is communicated at one end thereof with the internal space 35b in the cylinder portion 22 into which the plug 26b projects. The other end of the passage 35c opens to the outside of the cylinder portion 22. The passage 35c is in communication with the internal space 35 (chamber 35b) in the cylinder portion 22 irrespective of the sliding movement of the plunger 24 and the tubular member 25.

It should be noted that the distal ends of the plugs 26a and 26b face each other across a space. The space between the plugs 26a and 26b is communicated with the internal space 35 in the cylinder portion 22 through communicating bores 36. As shown in FIG. 1, in the switching valve 5 arranged as described above, the passages 29a and 30a in the plug 26a are connected, as a supply port 41, to the accumulator 4b of the external hydraulic pressure supply source 4, and the passages 29b and 30b in the plug 26b are connected, as a drain port 42, to the reservoir 4d of the external hydraulic pressure supply source 4.

The passage 35c is connected to the wheel cylinder 3 through another switching valve 8. Thus, the passage 35c forms an output port 43.

The operation of the switching valve 20, arranged as described above, will be described below in connection with the operation of the vehicular brake controller.

The switching valves 6 and 8 are in respective positions as shown in FIG. 1 when the brake pedal 1 is not stepped on, that is, in a state where the brake lever switch 11 provided for the brake pedal 1 senses that there is no brake operation by the driver.

In this state, the switching valve 20 (5) is in a state where the coil 33 is not energized. That is, as shown in FIG. 2, the plunger 24 is pressed rightwardly by the action of the helical compression spring 32, causing the end 25a of the tubular member 25 on the small-diameter inner periphery side of the plunger 24 to be held in contact with the tapered wall surface 28a (valve seat) of the recess 27a of the plug 26a, and thus cutting off the communication between the annular groove 31a of the tubular member 25 and the internal space 35 (chamber 35a) in the cylinder portion 22. The openings of the passages 30a in the plug 26a are closed by the inner peripheral surface of the tubular member 25 on the small-diameter inner periphery side of the plunger 24, thereby also cutting off the communication between the annular groove 31a of the tubular member 25 and the supply port 41. It should be noted that although the openings of the passages 30a are closed by the inner peripheral surface of the tubular member 25, complete sealing cannot be obtained because of the need of a clearance for the sliding movement of the tubular member 25 on the plugs 26a and 26b. According to the present invention, complete sealing can be obtained by the contact of the right end of the tubular member 25 with the tapered wall surface 28a. This holds true also for the relationship between the openings of the passages 30b, the left end of the tubular member 25 and the tapered wall surface 28b.

Figure 2:
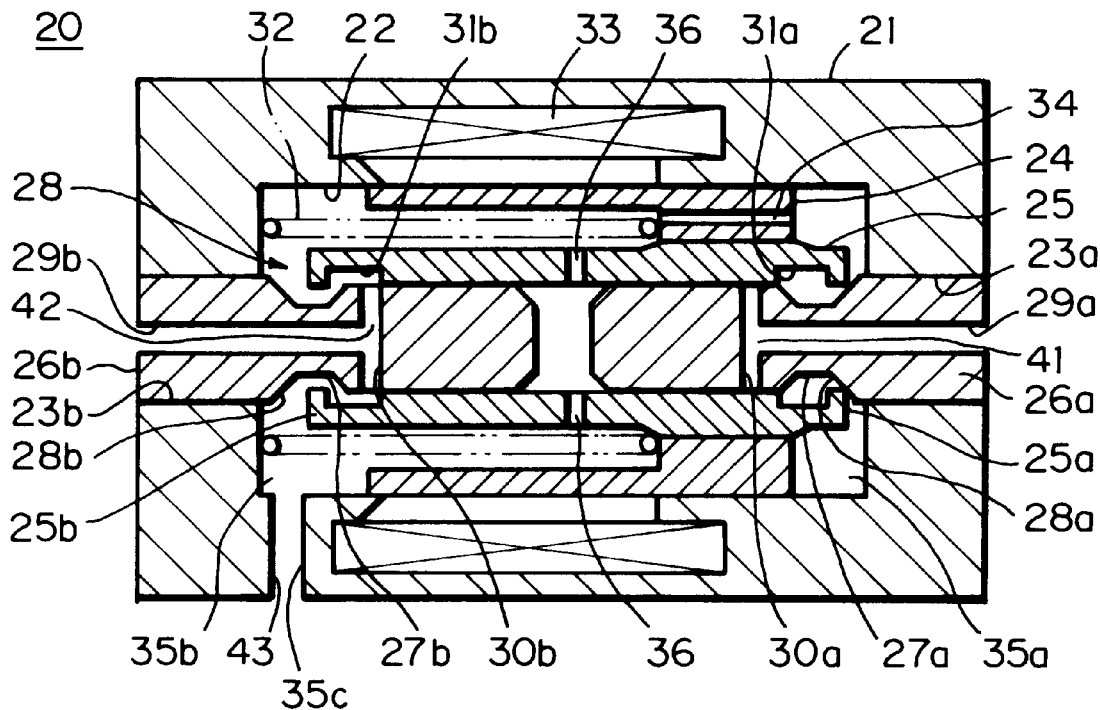
FIG. 2 is a sectional view showing a switching valve in a normal position according to an embodiment of the present invention.

In the state shown in FIG. 2, the end 25b of the tubular member 25 on the large-diameter inner periphery side of the plunger 24 is not in contact with the tapered wall surface 28b (valve seat) of the recess 27b of the plug 26b. Accordingly, the annular groove 31b of the tubular member 25 and the internal space 35 (chamber 35b) in the cylinder portion 22 are in communication with each other. The openings of the passages 30b in the plug 26b are not closed by the inner peripheral surface of the tubular member 25 on the large-diameter inner periphery side of the plunger 24, but face the annular groove 31b of the tubular member 25, thus providing communication between the annular groove 31b of the tubular member 25 and the release port 42.

Accordingly, in FIG. 2, the hydraulic pressure on the output port 43 (wheel cylinder 3) side is equal to the hydraulic pressure on the release port 42 (reservoir 4d) side, which is approximately equal to the atmospheric pressure.

In this state, the pressure-receiving area in the chamber 35a of the cylinder portion 22 with respect to the end 25a of the tubular member 25 that is in contact with the tapered wall surface 28a of the recess 27a of the plug 26a is equal to the pressure-receiving area in the chamber 35b of the cylinder portion 22 with respect to the end 25b of the tubular member 25 on the side thereof closer to the plug 26b, and the chambers 35a and 35b are kept at the same pressure because these chambers are communicated with each other through the communicating bore 34 provided in the plunger 24. Therefore, the plunger 24 and the tubular member 25 are not subjected to the action of a hydraulic pressure.

Accordingly, the set load of the helical compression spring 32 needs to be only a minimum pressure required to move the plunger 24 and the tubular member 25 rightwardly as viewed in FIG. 2.

Next, when the brake pedal 1 is stepped on, the brake lever switch 11 senses the initiation of a brake operation by the driver, and upon receipt of a signal indicative of this fact, the control unit ECU causes the switching valves 6 and 8 to switch to respective positions reverse to those shown in FIG. 1. Further, the control unit ECU detects the amount by which the brake pedal 1 has been pressed on the basis of the output from the sensor 9, calculates a hydraulic pressure to be produced by the wheel cylinder 3 in correspondence with the amount of operation of the brake pedal 1 on the basis of the result of the detection and supplies a driving current to the coil 33 of the switching valve 20 (5) to supply the calculated hydraulic pressure to the wheel cylinder 3 from the external hydraulic pressure supply source 4.

Figure 3:
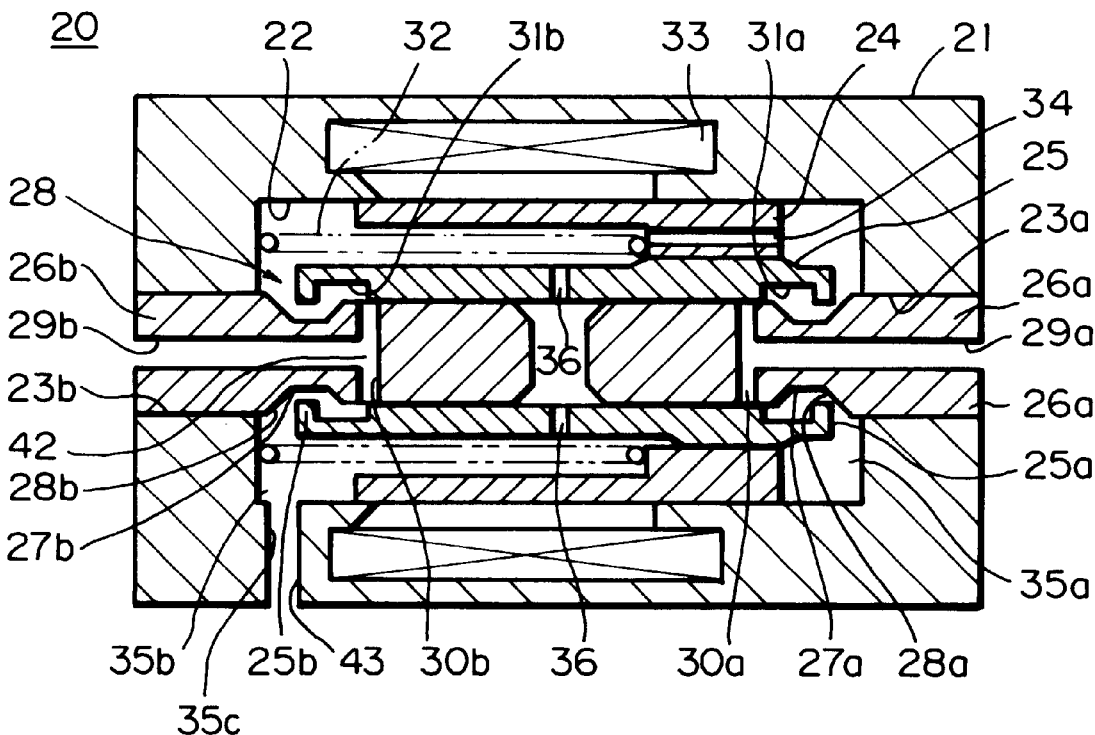
FIG. 3 is a sectional view showing the switching valve in a first-stage operative position.
Figure 4:
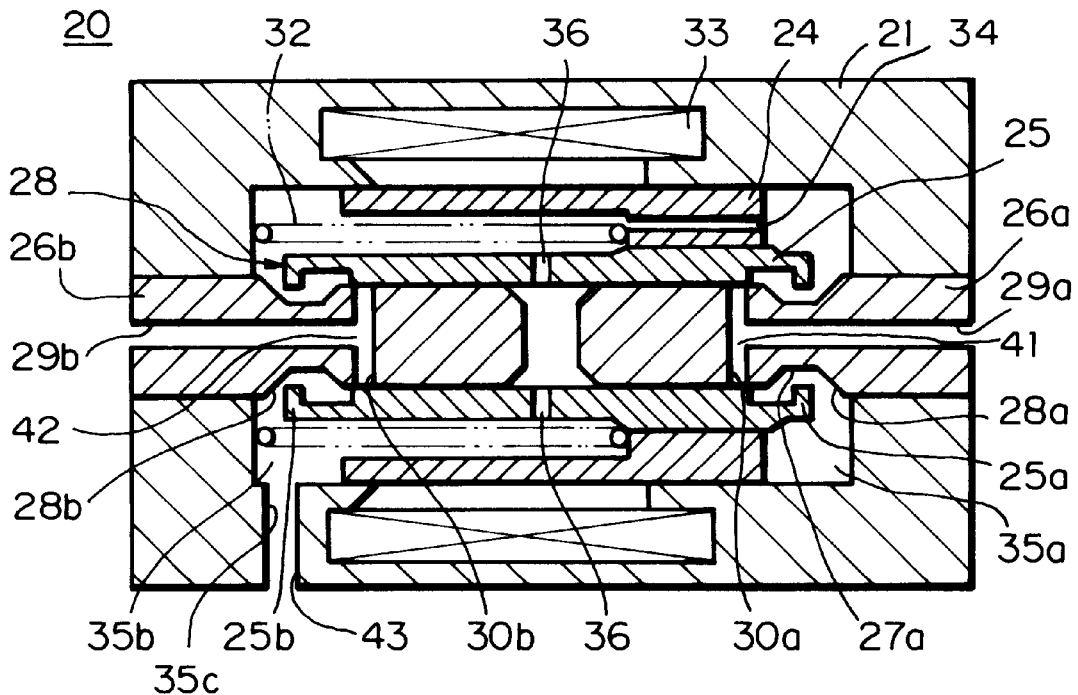
FIG. 4 is a sectional view showing the switching valve in a second-stage operative position.

In the switching valve 20, when the driving current begins to flow through the coil 33, as shown in FIG. 3, the plunger 24 and the tubular member 25 begin to move leftward as viewed in the figure against the force of the helical compression spring 32. First, the end 25a of the tubular member 25 on the small-diameter inner periphery side of the plunger 24 slightly separates from the tapered wall surface 28a (valve seat) of the recess 27a of the plug 26a, thus allowing the annular groove 31a of the tubular member 25 and the internal space 35 (chamber 35a) in the cylinder portion 22 to communicate with each other. However, in this state, the openings of the passages 30a of the plug 26a are still closed by the inner peripheral surface of the tubular member 25 on the small-diameter inner periphery side of the plunger 24. Hence, the communication between the annular groove 31a of the tubular member 25 and the supply port 41 is still cut off. On the other hand, the end 25b of the tubular member 25 on the large-diameter inner periphery side of the plunger 24 has not yet been brought into contact with the tapered wall surface 28b (valve seat) of the recess 27b of the plug 26b by the movement of the plunger 24 and the tubular member 25. Therefore, the annular groove 31b of the tubular member 25 and the internal space 35 (chamber 35b) in the cylinder portion 22 are still in communication with each other, and the openings of the passages 30b of the plug 26b are not closed by the inner peripheral surface of the tubular member 25 on the large-diameter inner periphery side of the plunger 24. However, the movement of the plunger 24 and the tubular member 25 reduces the area of a passage formed between the annular groove 31b of the tubular member 25 and a portion facing the annular groove 31b by an amount corresponding to the amount of movement of the plunger 24 and the tubular member 25 and similarly reduces the area of a passage formed by a gap between the end 25b of the tubular member 25 and the tapered wall surface 28b of the recess 27b of the plug 26b to provide communication between the annular groove 31b of the tubular member 25 and the internal space 35 (chamber 35b) in the cylinder portion 22. As the plunger 24 and the tubular member 25 further move, as shown in FIG. 4, the end 25a of the tubular member 25 further separates from the tapered wall surface 28a (valve seat) of the recess 27a of the plug 26a. Consequently, although the annular groove 31a of the tubular member 25 and the internal space 35 (chamber 35a) in the cylinder portion 22 are kept in communication with each other and so are the annular groove 31b of the tubular member 25 and the internal space 35 (chamber 35b) in the cylinder portion 22, the openings of the passages 30a in the plug 26a are still closed by the inner peripheral surface of the tubular member 25 on the small-diameter inner periphery side of the plunger 24, and the openings of the passages 30b in the plug 26b are also closed by the inner peripheral surface of the tubular member 25 on the large-diameter inner periphery side of the plunger 24.

Accordingly, during the above-described movement of the plunger 24 and the tubular member 25, the pressure-receiving area in the chamber 35a of the cylinder portion 22 with respect to the end 25a of the tubular member 25 on the side thereof closer to the plug 26a is equal to the pressure-receiving area in the chamber 35b of the cylinder portion 22 with respect to the end 25b of the tubular member 25 on the side thereof closer to the plug 26b, and the chambers 35a and 35b are kept at the same pressure because these chambers are communicated with each other through the communicating bore 34 provided in the plunger 24. Therefore, the plunger 24 and the tubular member 25 are not subjected to any moving force of hydraulic pressure.

Figure 5:
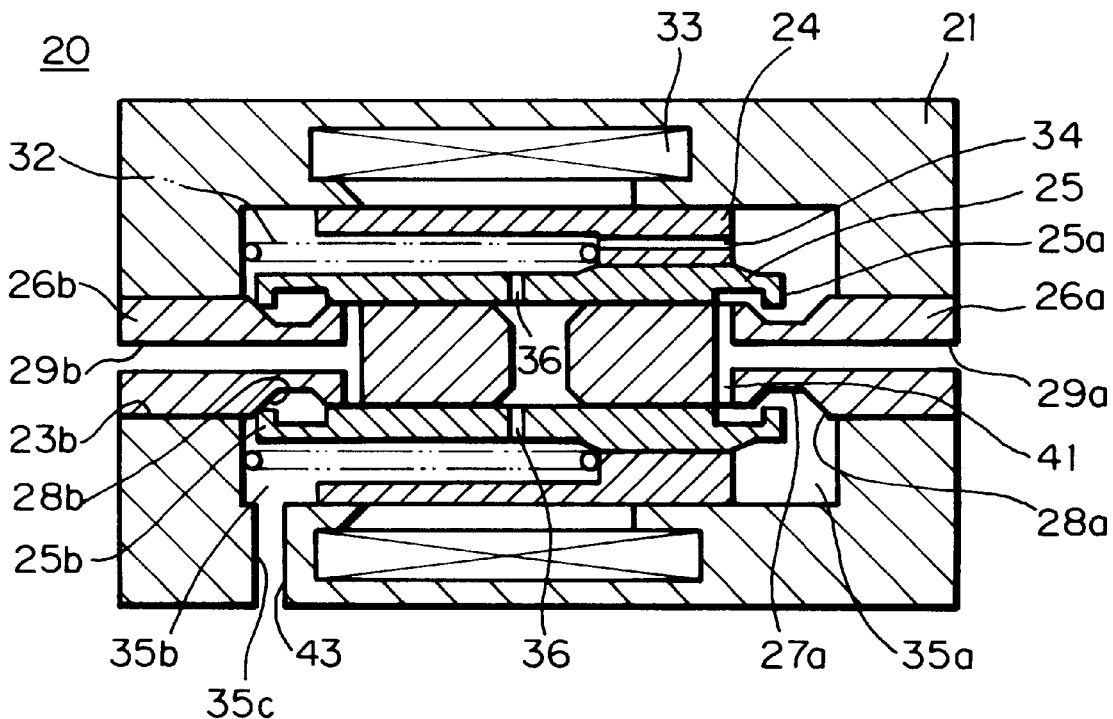
FIG. 5 is a sectional view showing the switching valve in a third-stage operative position.

As the plunger 24 and the tubular member 25 further move leftwardly from their positions shown in FIG. 4, the end 25a of the tubular member 25 further separates from the tapered wall surface 28a (valve seat) of the recess 27a of the plug 26a, and the openings of the passages 30a in the plug 26a begin to face the annular groove 31a of the tubular member 25 with the communication kept between the annular groove 31a of the tubular member 25 and the internal space 35 (chamber 35a) in the cylinder portion 22. Consequently, the chamber 35a in the cylinder portion 22 is supplied with the boosted hydraulic pressure stored in the accumulator 4b of the external hydraulic pressure supply source 4 through the passages 29a and 30a formed in the plug 26a and further through the annular groove 31a of the tubular member 25 and the recess 27a of the plug 26a. At the same time, the boosted hydraulic pressure in the chamber 35a is transmitted to the chamber 35b through the communicating bore 34. Thus, the pressure-receiving area in the chamber 35a of the cylinder portion 22 with respect to the end 25a of the tubular member 25 on the side thereof closer to the plug 26a is equal to the pressure-receiving area in the chamber 35a of the cylinder portion 22 with respect to the end 25b of the tubular member 25 on the side thereof closer to the plug 26b, and the chambers 35a and 35b are kept at the same pressure because these chambers are communicated with each other through the communicating bore 34 provided in the plunger 24. Therefore, the plunger 24 and the tubular member 25 are not subjected to any moving force of hydraulic pressure. Thus, the plunger 24 and the tubular member 25 move to a position where the end 25b of the tubular member 25 comes in contact with the tapered wall surface 28b (valve seat) of the recess 27b of the plug 26b, as shown in FIG. 5.

As a result, the hydraulic pressure on the supply port 41 side is transmitted from the output port 43 to the wheel cylinder 3 through the chamber 35a, the communicating bore 34, the chamber 35b and the passage 35c.

In the foregoing, the operation of the switching valve 20 (5) in a case where the brake pedal 1 is stepped on has been described. Conversely, when the driver stops stepping on the brake pedal 1 and releases it, the brake lever switch 11 senses that the brake pedal 1 has been released, and the control unit ECU stops the supply of the driving current to the coil 33 of the switching valve 20 (5). Consequently, the plunger 24 and the tubular member 25 are moved rightwardly from their positions shown in FIG. 5 by the urging force of the helical compression spring 32 to return to the state shown in FIG. 2 through the positions shown in FIGS. 4 and 3 in reverse relation to the above.

Thus, the hydraulic pressure in the wheel cylinder 3 is reduced.

Figure 6:
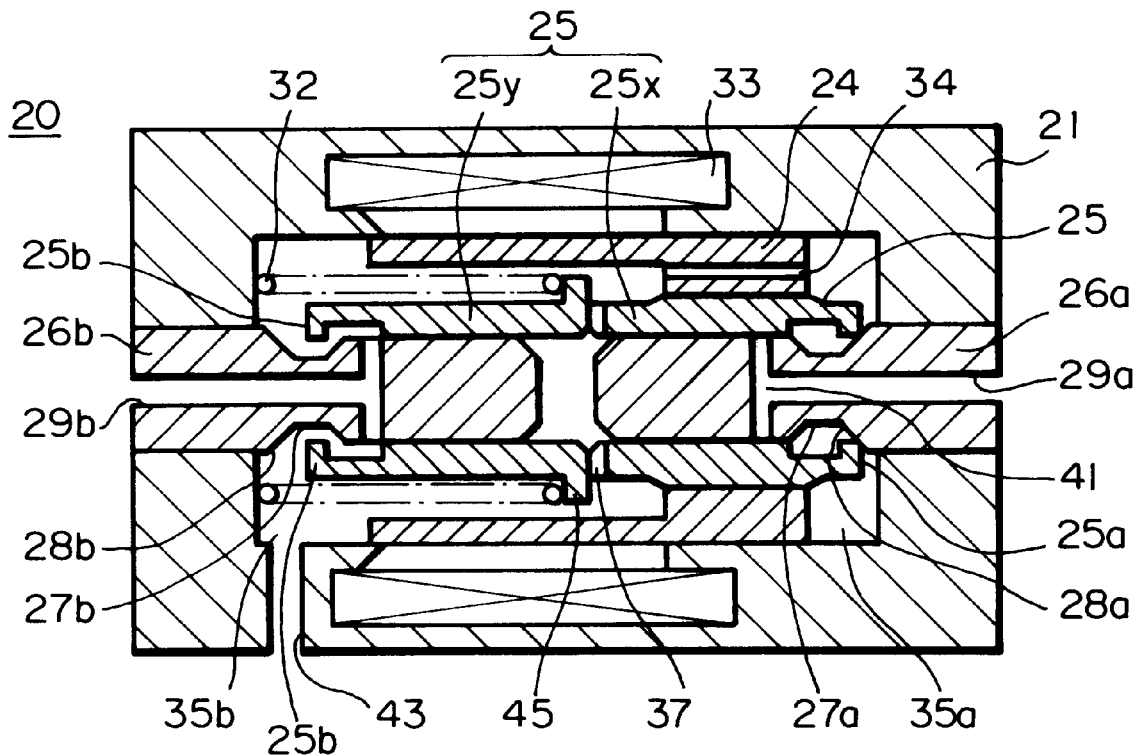
FIG. 6 is a sectional view showing a switching valve, according to another embodiment of the present invention, in a normal position.

FIG. 6 shows another embodiment of the switching valve according to the present invention. In this embodiment, the tubular member 25 in the above-described embodiment is split into two separate members. More specifically, a tubular member 25x is integrally secured to the plunger 24 and arranged to be slidable relative to the plug 26a. A tubular member 25y has approximately the same structure as that of the tubular member 25x and is slidable relative to the plug 26b.

The helical compression spring 32 abuts on a flange 45 of the tubular member 25y to urge the tubular member 25y rightwardly as viewed in the figure and to transmit the urging force to the tubular member 25x through the tubular member 25y.

A cut portion 37 is provided in an end surface of the tubular member 25x which abuts on the tubular member 25y to provide communication between the inside and outside of the tubular member 25 as in the case of the communicating bores 36 in the first-described embodiment. It should be noted that the cut portion 37 may be provided on either of the tubular members 25x and 25y.

In this embodiment, because the tubular member 25 is split into the tubular members 25x and 25y, even if there is misalignment between the plugs 26a and 26b due, for example, to the formation of the distal end small-diameter portion and the recess 27 on each plug 26 by machining, the plugs 26a and 26b can smoothly slide in the tubular members 25x and 25y, and the ends 25a and 25b of the tubular member 25 can surely contact the wall surface 28a of the plug 26a and the wall surface 28b of the plug 26b, respectively. Accordingly, the reliability improves, and the production is facilitated.

It will be appreciated by those skilled in the art that many modifications are possible without departing from the spirit of the invention. For example, the arrangement regarding the ports 41 and 42 is symmetrical. Therefore, both of the ports 41 and 42 can selectively be used as an input port. More particularly, both of them can be connected to fluid sources and the switching valve may operate to take a first position in which fluid is directed to the output port 43 with the port 41 functioning as an input port and a second position in which fluid is directed to the output port 43 with the port 42 functioning as an input port.

What is claimed is:

1. A fluid passage switching valve comprising:

a valve body having a cylinder portion formed therein and also having first, second and third ports adapted to be connected to outside lines;

first and second plug portions having proximal ends supported by said valve body at opposite ends of said cylinder portion, respectively, and extending inwardly into said cylinder portion;

a plunger provided movably in said cylinder portion so as to slide on an inner peripheral surface of said cylinder portion and an outer peripheral surface of said first and second plug portions, said plunger dividing the interior of the cylinder into a first fluid chamber on the side of said first plug portion and a second fluid chamber on the side of said second plug portion and having a communicating bore which provides communication between said first and second fluid chambers and annular grooves in the inner surfaces of a first end portion of the plunger on the side of the first fluid chamber and a second end portion of the plunger on the side of the second fluid chamber, respectively;

a spring for urging said plunger toward said first plug portion; and a solenoid which, when energized, causes said plunger to move toward said second plug portion against the force of said spring, said first plug portion having a first passage extending from said first port so as to open in said outer peripheral surface of the first plug portion on which said plunger slides to provide a passage opening, and a recess on the outer peripheral surface offset from the passage opening toward the proximal end of the first plug portion to form a tapered side surface, said second plug portion having a second passage extending from said second port so as to open in said outer peripheral surface of the second plug portion on which said plunger slides to provide a passage opening, and a recess on the outer peripheral surface offset from the passage opening toward the proximal end of the second plug portion to form a tapered side surface, said plunger being movable between:
- (a) a first position wherein said first end portion of the plunger engages with said tapered side surface of the first plug portion; said passage opening of the first passage is blocked by said inner surface of the plunger without facing said annular groove of the first end portion of the plunger; said second end portion of the plunger is spaced apart from said tapered side surface of the second plug portion; and said passage opening of the second passage faces said annular groove of the second end portion of the plunger, so that said first port is disconnected from said first fluid chamber and thence from said third port whereas said second and third ports are communicated with each other, and
- (b) a second position wherein said second end portion of the plunger engages with said tapered side surface of the second plug portion; said passage opening of the second passage is blocked by said inner surface of the plunger without facing said annular groove of the second end portion of the plunger; said first end portion of the plunger is spaced apart from said tapered side surface of the first plug portion; and said passage opening of the first passage faces said annular groove of the first end portion of the plunger, so that said second port is disconnected from said second fluid chamber and thence from said third port whereas said first and third ports are communicated with each other.

2. A fluid passage switching valve as claimed in claim 1, wherein said plunger takes, when it moves between said first and second positions:
- (c) a third position wherein said first end portion of the plunger is spaced apart from said tapered side surface of the first plug portion; said passage opening of the first passage is blocked by said inner surface of the plunger without facing said annular groove of the first end portion of the plunger; said second end portion of the plunger is spaced apart from said tapered side surface of the second plug portion; said passage opening of the second passage is blocked by said inner surface of the plunger without facing said annular groove of the second end portion of the plunger, so that both passage openings of said first and second passages are closed by said inner surface of the plunger to disconnect both of said first and second ports from said third port.

* * * * *